May 15, 1962  DE LACY F. FERRIS ET AL  3,034,293
BOOSTER AND SUSTAINER THRUST DEVICES
Filed April 6, 1959
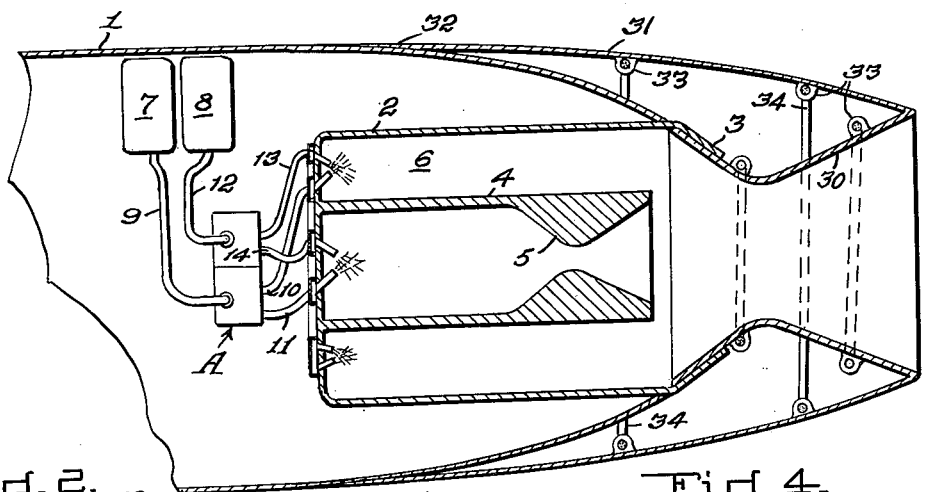
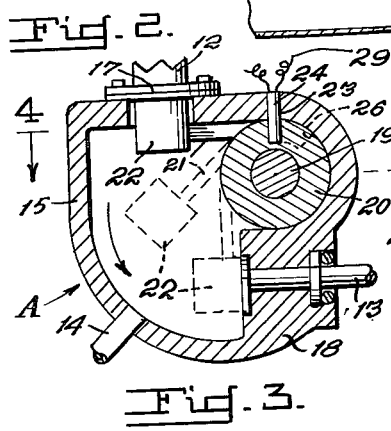
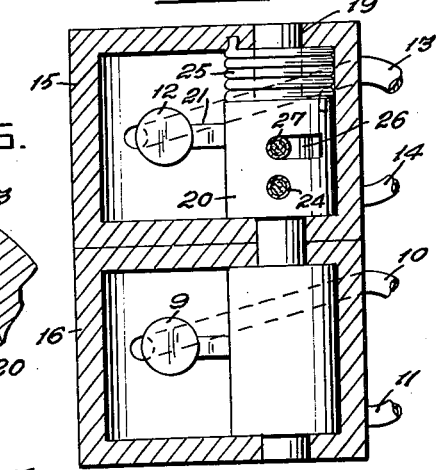
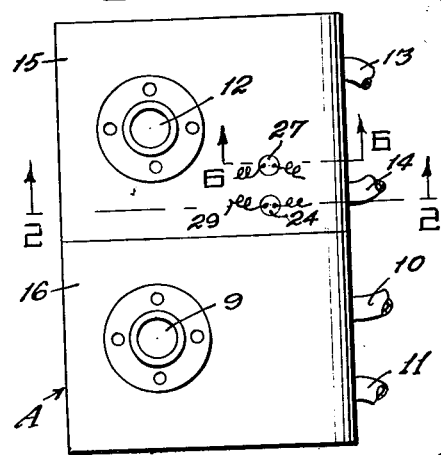
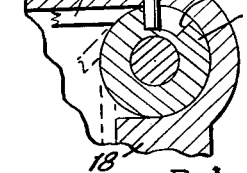
INVENTORS,
DeLacy F. Ferris
BY Robertson Youngquist
S. J. Rotondi, A. J. Dupont & E. R. Mackert

United States Patent Office 3,034,293
Patented May 15, 1962

3,034,293
BOOSTER AND SUSTAINER THRUST DEVICES
De Lacy F. Ferris, Morristown, N.J., and Robertson Youngquist, Kensington, Md., assignors to the United States of America as represented by the Secretary of the Army
Filed Apr. 6, 1959, Ser. No. 804,555
1 Claim. (Cl. 60—35.6)

This invention relates to a rocket motor with integral liquid booster and more particularly to a rocket motor having a booster which operates from the same propellent supply as the rocket motor.

It is common in the rocket motor art to provide the motor with a booster which operates for a short period of time at take off to provide the thrust necessary to get the rocket into flight. For the most part these boosters have been operated by a solid propellant carried in the booster unit. This necessitates that the booster unit be of substantial size and entails the problem of disposing of this unit after it has burned out.

In the present invention there is provided a cylindrical sustainer thrust chamber and an annular booster thrust chamber surrounding the sustainer thrust chamber. The two chambers are provided with liquid propellants from the same tanks. Since the booster thrust chamber does not carry its own propellant it may be made relatively small and remains in place in the motor after it has been shut off. The propellant feed system includes three position valves which in one position prevent any propellant feed, in a second position feed propellant to both the sustainer and booster thrust chambers, and in the third position feed propellant to only the sustainer thrust chamber.

It is an object of this invention to provide a rocket motor having sustainer and booster thrust chambers supplied with liquid propellants from a common source.

It is another object of this invention to provide a rocket motor having concentric sustainer and booster thrust chambers.

Another object of the invention is to provide a rocket motor having a booster nozzle which is disintegrated in flight.

It is also an object of this invention to provide a rocket motor having valving mechanism for directing liquid propellants from the same source to sustainer and booster thrust chambers.

Yet another object is to provide a valve which is spring biased and held in closed and intermediate positions by explosively operated latches.

These and other objects will become more apparent when reference is had to the following detailed description and accompanying drawing in which:

FIGURE 1 is an axial sectional view of the rocket motor,

FIGURE 2 is a cross-sectional view of the propellant valve taken on the line 2—2 of FIGURE 3, FIGURE 3 is an elevation of the valve unit, FIGURE 4 is a cross-sectional view of the valve taken on the line 4—4 of FIGURE 2, FIGURE 5 is an enlarged sectional detail view of the explosive latch shown in FIGURE 2, and FIGURE 6 is a cross-sectional view taken on the line 6—6 of FIGURE 3.

Referring now to the drawing there is shown in FIGURE 1 a rocket having the outer housing 1, the forward end of which will carry instruments, explosives or the like. Mounted within the rearward end of the housing is the cylindrical chamber 2 which is inwardly turned at the rearward end at 3. Mounted concentrically within the chamber 2 is the cylindrical combustion chamber 4 having integrally formed therewith the nozzle 5. The chamber 4 is the sustainer thrust chamber while the annular space 6 between the outer and inner cylindrical walls constitutes a booster thrust chamber.

The rocket is propelled by liquid propellants which are carried by the tanks 7 and 8 mounted forwardly of the thrust chambers. The propellants may be of any well known type as, for example, fuel and oxidizer, hypergolic liquids, etc. These propellants are utilized in both the sustainer and booster thrust chambers and are directed thereto by the valve unit A. The first propellant is conducted from tank 7 through outlet pipe 9 to the valve unit A from which it is conducted by pipes 10 and 11 to the booster and sustainer thrust chambers 6 and 4, respectively. The second propellant is conducted from tank 8 to valve unit A by conduit 12 and from unit A to the booster and sustainer thrust chambers 6 and 4 by the conduits 13 and 14, respectively.

The valve unit A is shown in detail in FIGURES 2–6 and comprises two isolated valve housings 15 and 16. Inasmuch as these valve housings and the valves contained therein are identical only one will be described.

The valve housing 15 has bolted to the upper side thereof the inlet conduit 12 and clamped between the conduit and housing is the rupturable diaphragm 17. The outlet conduit 14 extends from the lower portion of the housing and the housing is thickened as at 18 and the conduit 13 extends therethrough. Journalled in the upper portion of the housing is the shaft 19 having the enlarged central portion 20 and the arm 21 extending tangentially therefrom. The arm 21 carries at its end a weighted head member 22 which in the solid line position of FIGURE 2 abuts the diaphragm 17 in the propellant inlet 12. The enlarged portion of the shaft 20 is provided with a recess 23 which receives the latch member 24 and is also provided with torsion spring 25 which tends to rotate the shaft counterclockwise as viewed in FIGURE 2. The enlarged portion 20 of the shaft is also provided with an arcuate slot 26 of 45° extent axially spaced from the recess 23. Latch 27 is carried by the housing 15 and received in one end of the slot 26.

The latches 24 and 27 are of the explosively operated type and a sectional view of latch 24 is shown in FIGURE 5. The body of the latch is bored to form a hollow chamber and this chamber carries the explosive charge 28. The charge is detonated electrically by passing a current through the wire 29. The detonating force reacts against the enlarged shaft section 20 and projects the latch free of the shaft.

Attached to the rear end of the rocket motor is the booster jet nozzle 30 which underlies the inwardly turned rearward end 3 of the chamber 2. The nozzle has the outer fairing portion 31 which contacts the housing 1 at 32 and forms an aerodynamic continuation thereof. Spaced around the interior surface of the booster nozzle and connected thereto is a plurability of eyelets 33. Threaded through these eyelets 33 is the cord 34 which is of known explosive type.

Operation

When the rocket motor is on the ground prepared for the takeoff the valves are in the position shown in full lines in FIGURE 2. The explosive latch 24 is detonated when it is desired to fire the rocket. The latch 24 is thus withdrawn from the valve shaft portion 20 and the spring 25 and weight of the valve head 22 are operative to swing the valve to the 45° position shown in dotted lines in FIGURE 2. The valve is limited to this degree of movement by engagement of the end of slot 26 with the second latch 27.

After the valve head 22 has moved 45° the pressure of the propellants in tanks 7 and 8 is sufficient to burst the rupturable diaphragms 17. The propellants then flow through lines 10, 11, 13 and 14 to both the booster and sustainer thrust chambers. If the propellants are of the combustible type ignition is initiated by any conventional means such as an electrical spark. Both thruster chambers are now effective to provide a high velocity jet stream passing through the nozzle 30.

It is desired after the rocket has been in flight for a predetermined period of time to cut off the booster thrust chamber 6. This is accomplished by detonating the second explosive latch 27 to withdraw it from the slot 26. This is accomplished electrically by means of a timer (not shown) or a signal from the ground. Upon explosion and removal of the latch 27 the spring 25 is effective to rotate the valve heads 22 to the vertical dotted line position shown in the FIGURE 2, thus cutting off propellant flow to the lines 10 and 13. This deactivates the booster thrust chamber.

The same means which provides the electrical signal to explode the latch 27 concurrently provides an electrical impulse to detonate the explosive cord 34. This breaks the booster nozzle 30 and fairing 31 into harmless fragments which fall clear of the rocket motor. The sustainer thrust chamber then operates exhausting through its nozzle 5 until the propellants are exhausted from tanks 7 and 8.

It will be apparent that the embodiment shown is only exemplary and that various modifications can be made in construction and arrangement within the scope of the invention as defined in the appended claim.

We claim:

A rocket motor comprising a shell casing for the rocket, a sustainer thrust chamber within the casing provided with an integral reaction nozzle, a booster thrust chamber surrounding the thrust chamber in concentric relation thereto, said booster chamber provided with a reaction nozzle adapted to be discarded by explosive units attached to said nozzle, a source of propellant, a one way valve unit actuated by explosive latches, a first conduit connecting said propellant source with said valve unit, a membrane closing said first conduit at the valve intake, second and third conduits connecting said valve unit with said sustainer and booster thrust chambers respectively, said valve unit having a three position head member, said member supported by an arm pivoted on a vertical shaft, said shaft having an enlarged portion with a recess for the reception of an explosive latch for retaining said head member in a first position against the tension of a biased spring, said head member when in the first position supporting said membrane to prevent flow of the propellant, an arcuate slot of 45° in said enlarged portion adapted to receive a second explosive latch which limits the movement of the head member to that permitted by the slot, said second explosive latch connected to the explosive units on the booster nozzle to fire simultaneously, the head member released upon firing of the first explosive latch permitting the membrane to rupture to start the propellant flow, said head member actuated by the spring to a second position for launching the rocket and limited thereto by movement of second explosive latch in the arcuate slot, said head member when in the second position permitting flow of the propellant from the first conduit to the second and third conduits to supply both the thrust and booster chambers, said second explosive latch when fired releasing said head member to a third position to stop the flow of fuel only to the booster and to actuate the explosive units to disintegrate the booster nozzle to reduce the load of the rocket in flight.

References Cited in the file of this patent

UNITED STATES PATENTS

| | | |
|---|---|---|
| 1,535,190 | Metre | Apr. 28, 1925 |
| 2,347,204 | Lindsay | Apr. 25, 1944 |
| 2,402,826 | Lubbock | June 25, 1946 |
| 2,408,111 | Truax et al. | Sept. 24, 1946 |
| 2,508,420 | Redding | May 23, 1950 |
| 2,531,761 | Zucrow | Nov. 28, 1950 |
| 2,605,608 | Barclay | Aug. 5, 1952 |
| 2,671,312 | Roy | Mar. 9, 1954 |
| 2,678,055 | Heim | May 11, 1954 |
| 2,814,929 | Morley et al. | Dec. 3, 1957 |
| 2,850,976 | Seifert | Sept. 9, 1958 |
| 2,880,576 | Kappus | Apr. 7, 1959 |
| 2,919,543 | Sherman | Jan. 5, 1960 |

FOREIGN PATENTS

| | | |
|---|---|---|
| 719,946 | Great Britain | Dec. 8, 1954 |